US009858450B2

(12) United States Patent
Van Bosch et al.

(10) Patent No.: US 9,858,450 B2
(45) Date of Patent: Jan. 2, 2018

(54) ASSEMBLIES, DEVICES, AND SYSTEMS FOR POLLING NFC TAGS

(71) Applicant: GOOGLE TECHNOLOGY HOLDINGS LLC, Mountain View, CA (US)

(72) Inventors: James A. Van Bosch, Crystal Lake, IL (US); Pavel A. Shostak, Evanston, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 98 days.

(21) Appl. No.: 14/208,936

(22) Filed: Mar. 13, 2014

(65) Prior Publication Data
US 2014/0263648 A1    Sep. 18, 2014

Related U.S. Application Data

(60) Provisional application No. 61/792,647, filed on Mar. 15, 2013.

(51) Int. Cl.
| | |
|---|---|
| *G06K 7/10* | (2006.01) |
| *G06K 7/08* | (2006.01) |
(Continued)

(52) U.S. Cl.
CPC ............... *G06K 7/087* (2013.01); *G06K 7/00* (2013.01); *G06K 7/10138* (2013.01);
(Continued)

(58) Field of Classification Search
CPC ........... G06K 7/10386; G06K 7/10128; G06K 7/10138
See application file for complete search history.

(56) References Cited

U.S. PATENT DOCUMENTS 5,673,037 A * 9/1997 Cesar ................... G06K 7/0008
235/385
8,106,749 B2   1/2012 Ina et al.
(Continued)

FOREIGN PATENT DOCUMENTS

CN      101010887 A    8/2007
CN      102480312 A    5/2012
(Continued)

OTHER PUBLICATIONS

Baharlou, "International Preliminary Report on Patentability issued in International Application No. PCT/US2014/028170", dated Sep. 15, 2015, Sep. 15, 2015, 5 pages.
(Continued)

*Primary Examiner* — Suezu Ellis
(74) *Attorney, Agent, or Firm* — Johnson, Marcou & Isaacs, LLC

(57) ABSTRACT

Some battery-powered devices, such as smartphones, can be unlocked with use of wearable NFC (Near Field Communication) authentication devices. However, using conventional NFC authentication procedures is expensive in terms of power consumption because of continual rediscovery and reauthentication of the wearable authentication device. To address this, the present inventors devised, among other things, more efficient methods for authenticating NFC-tagged authentication device, such as rings. For example, one embodiment uses two NFC polling loops or structures, instead of one as conventionally done. The first loop, used for initial authentication, entails scanning for two or more types of NFC tags. And the second loop, invoked after initial authentication, scans for a smaller subset of the two or more types to conserve battery power.

32 Claims, 2 Drawing Sheets

(51) Int. Cl.
*G06K 19/077* (2006.01)
*H04L 29/06* (2006.01)
*H04W 4/00* (2009.01)
*H04W 12/06* (2009.01)
*G06K 7/00* (2006.01)
*G06K 17/00* (2006.01)

(52) U.S. Cl.
CPC ..... *G06K 7/10336* (2013.01); *G06K 7/10544* (2013.01); *G06K 17/00* (2013.01); *G06K 19/07775* (2013.01); *H04L 63/0853* (2013.01); *H04W 4/008* (2013.01); *H04W 12/06* (2013.01); *Y02B 60/50* (2013.01)

(56) References Cited

U.S. PATENT DOCUMENTS

| | | | | |
|---|---|---|---|---|
| 9,063,737 | B2* | 6/2015 | Babu | G06F 1/3287 |
| 2006/0052055 | A1* | 3/2006 | Rowse | G06K 7/0008 |
| | | | | 455/41.1 |
| 2007/0026825 | A1 | 2/2007 | Wilson et al. | |
| 2009/0192937 | A1* | 7/2009 | Griffin | G06Q 20/10 |
| | | | | 705/42 |
| 2011/0187509 | A1* | 8/2011 | Raptis | G06K 7/10356 |
| | | | | 340/10.3 |
| 2012/0045989 | A1* | 2/2012 | Suumaki | H04W 8/005 |
| | | | | 455/41.1 |
| 2012/0143703 | A1* | 6/2012 | Wall | G06Q 20/20 |
| | | | | 705/16 |
| 2012/0322371 | A1* | 12/2012 | Lee | H04W 4/008 |
| | | | | 455/41.1 |
| 2013/0005242 | A1 | 1/2013 | Royston et al. | |
| 2013/0084798 | A1* | 4/2013 | Faithorn | G06Q 20/3278 |
| | | | | 455/41.1 |
| 2013/0225071 | A1* | 8/2013 | Royston | H04B 5/0031 |
| | | | | 455/41.1 |
| 2013/0244578 | A1* | 9/2013 | Bacioccola | H04M 1/72533 |
| | | | | 455/41.2 |
| 2017/0085457 | A1* | 3/2017 | Huang | H04L 43/103 |

FOREIGN PATENT DOCUMENTS

JP  2003289914 A * 10/2003
WO  2009106672 A1  9/2009

OTHER PUBLICATIONS

Veen, "International Search Report and Written Opinion issued in International Application No. PCT/US2014/028170", dated Aug. 6, 2014, Aug. 6, 2014, 7 pages.
"Office Action issued in Chinese Application No. 201480021163.6 filed Mar. 14, 2014", dated Jun. 26, 2017, 10 pages.

* cited by examiner

ASSEMBLIES, DEVICES, AND SYSTEMS FOR POLLING NFC TAGS

RELATED APPLICATION

The present application claims priority to U.S. Provisional Patent Application 61/792,647, which was filed on Mar. 15, 2013 and which is incorporated herein by reference in its entirety.

TECHNICAL FIELD

Various embodiments disclosed herein concern wearable authentication devices, such as those incorporating Near Field Communications (NFC) technology.

BACKGROUND

Near Field Communications (NFC) is a short-range wireless communications technology standard that relies on inductive coupling of two devices to transfer information over a short range of 10 centimeters (approximately 4 inches) or less. Recent years have witnessed growing usage of NFC technology in smart phones, key fobs, credit cards, and other devices, not only because of its high convenience and low cost, but also because its extremely short range makes it resistant to interception. For example, this technology has been used to enable users to unlock their phones by touching it with an NFC tag.

One problem the present inventors have recognized with this unlocking functionality is that it entails repeated polling (generation of magnetic field patterns) for reading two or more different types of NFC tags. In particular, the conventional polling process, initiated in response to turning on the phone, entails waking up a processor, which in turn causes generation of a magnetic field pattern for reading two or more types of NEC tags. If a tag is not found and confirmed to be authentic—to have the correct embedded code—the processor repeats the polling until the phone is turned off, or the tag is confirmed to be authentic. If the tag is confirmed authentic, the processor not only activates or unlocks the phone, but also regularly repeats the same polling procedure initially used to discover and authenticate the tag to confirm that the phone should remain unlocked. Unfortunately, the repeated polling in this manner to discover and re-authenticate consumes significant battery power and thus reduces battery life.

Accordingly, the present inventors have identified a need for more efficient methods of operating NFC-enabled devices.

BRIEF DESCRIPTION OF THE DRAWINGS

Various embodiments of authentication assemblies, wearable authentication devices, and related kits and/or systems are described below with reference to the following attached figures. Note that the figures, none of which are drawn to scale, are numbered sequentially and annotated with reference numbers to facilitate identification of various features and components. These drawings and numbers are referenced in the detailed description as a teaching aid, with like numbers referring to the same or similar features and components across the figures.

DETAILED DESCRIPTION

This document, which incorporates the drawings and the appended claims, describes one or more specific embodiments of one or more inventions. These embodiments, offered not to limit but only to exemplify and teach the invention(s), are shown and described in sufficient detail to enable those skilled in the art to implement or practice the invention(s). Thus, where appropriate to avoid obscuring the invention(s), the description may omit certain information known to those of skill in the art.

Overview

To address one or more problems with conventional approaches to detecting continued presence of an NFC authentication device, the present inventors, devised, among other things, one or more assemblies, devices, systems and methods for efficiently verifying presence of an NFC tag. For example, one embodiment includes two NFC polling loops or structures, with the first loop, invoked for initial authentication, scanning for a set of two or more types of NFC tags and the second loop, invoked after initial authentication, scanning for a smaller subset of the two or more types to conserve battery power.

Example System & Kit

Figure 1:
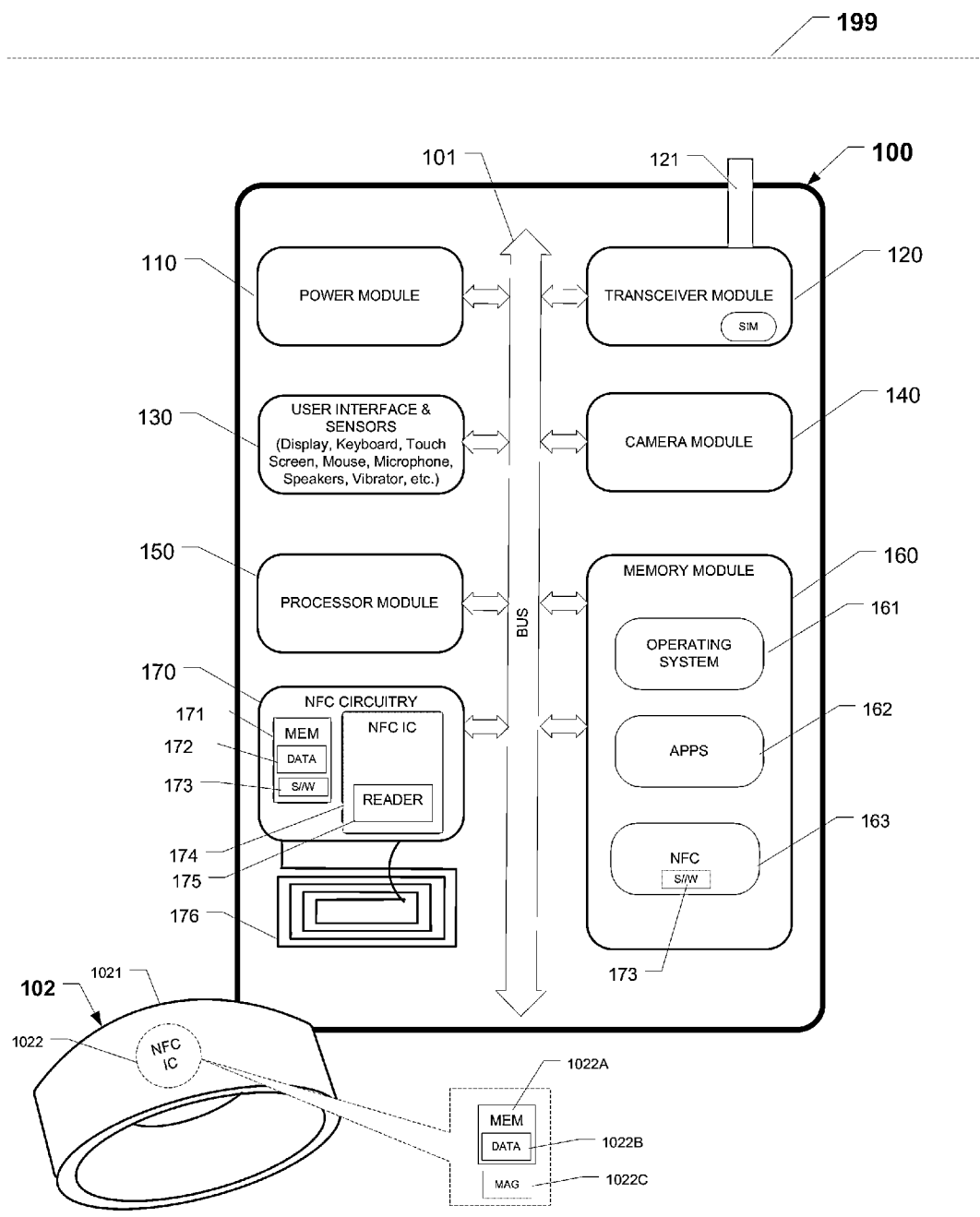
FIG. 1 is a block diagram of a kit or system which corresponds to one or more embodiments.

FIG. 1 shows an example system 199, which includes an electronic device 100 and a wearable authentication device 102. Electronic device 100 is generally representative of a personal computer, desktop computer, laptop computer, tablet computer, workstation, personal digital assistant, smart phone, mobile telephone, handheld navigation device, global positioning receiver, gaming system, media playback device, remote controller, vehicle steering wheel or structure, door handle or knob, joy stick, or any electronic or electromechanical device or assembly having an NFC or similar wireless communication capability and one or more features or functions for which authentication is required or desired as a prerequisite for user operation or access. Specifically, device 100 includes a central bus 101 which interconnects a power module 110, a transceiver module 120, a user interface module 130, a camera module 140, a processor module 150, a memory module 160, and NFC circuitry 170.

Power module 110 includes components and circuitry for providing power to various components of the electronic device 100. In the example embodiment, module 110 includes a power supply, one or more batteries, battery-charging circuitry, and an AC adapter module and plug (none of which are shown separately in the figure).

Transceiver module 120 includes one or more transceivers, transmitters, and/or receiver circuits for enabling communications with external devices, systems, and/or networks via available communications protocols. Some embodiments include circuitry for enabling personal area, local area, wide area, or metropolitan area wireless communications via one or more of the following protocols: CDMA (Code Division Multiple Access), GSM (Global System for Mobile Communications), Bluetooth, WiFi, WiMAX, GPS (Global Positioning System), LTE (Long Term Evolution), and UMTS (Universal Mobile Telecommunications System). Transceiver module 120 may also include one or more antennae 121, which are configured according to any known or developed structures for radiating and/or receiving electromagnetic energy as desired for one or more of the wireless transceivers, transmitters, and/or receiver circuits.

User interface and sensors module 130 includes one or more displays, one or more microphones, keyboards, alphanumeric keyboard, pointing devices, isolated buttons, soft and/or hard keys, touch screens, jog wheel, and/or any other known input device, as well as one or more sensors. Exemplary sensors include temperature sensors, accelerometers, and magnetometers. Additionally, user interface module includes one or more alert elements such as a loudspeaker, electronic display, and/or vibrator for creating audible, visible, and/or tactile alerts.

Camera module 140 includes one or more light or optical sensors, for example in the form of one or more arrays of image sensors. In some embodiments, the multiple image sensors are arranged to collect data from opposite directions, such as on the front and rear major surfaces of an apparatus housing.

Processor module 150 includes one or more processors, processing circuits, or controllers. In the example embodiment, processor module 150 takes any convenient or desirable form.

Memory module 160 takes the example form of one or more electronic, magnetic, or optical data-storage devices that stores code (machine-readable or executable instructions.) Specifically, memory module 160 stores code for operating system module 161, applications module 162, and NFC authentication module 163.

In the example embodiment, operating system module 161 takes the form of a conventional operating system (OS), such as Google Chrome OS, Android OS, Apple OS X, Apple iOS, Microsoft Windows, Microsoft Windows Mobile, or Linux. Operating system module 161 also includes instructions governing the auto-sleep or automatic shutdown of the display and/or other components of device 100. For example, if no user activity is detected during a predetermined time period, the operating system locks the device, which typically includes deactivating the display and entering a power-saving sleep mode. Reactivating or waking up the device then requires one or more user actions. Example actions include actuating a power switch or other button, and providing some form of user authentication, such as passcode, biometric input, or NFC tag presentation. The predetermined time period, in some embodiments, can be adjusted by the user to match his or her preferences, with a range, such as 15 seconds to 30 minutes. Furthermore, some embodiments provide for overriding this automatic shutdown when the device, for example a mobile phone, is coupled to a charger or a docking station in a vehicle. The override is provided to prevent the automatic shutdown, or more precisely the need to reactivate the display, from becoming a driver distraction. Other embodiments may override this automatic shutdown when certain applications, for example navigation applications, are executing. In the exemplary embodiment, this automatic shutdown functionality operates in parallel with or in the background of other ongoing operations of the device.

Phones also have a setting for when the phone locks after the phone enters the sleep state. This can be set from immediately up to 10 minutes. There is also an option so that when the power button is pressed to turn off the display the phone will immediately lock.

Applications module 162 includes one or more applications, such as a banking application or payment application, an email application, a presentation application, a telephony application, a text messaging application, and a game application, one or more of which may require detection of a NFC compliant authentication device prior to providing access to one or more portions of its functionality. As such, one or more of these applications directly and/or indirectly through use of capabilities of operating system 161 or through NFC interface module 163 communicate and/or otherwise collaborate with NFC circuitry 170 to implement the desired NFC authentication. In the exemplary embodiment NFC interface module 163 includes instructions for controlling, communicating with, and/or programming one or more portions of NFC circuitry 170, such as NFC memory 171.

In addition to NFC memory 171 which stores authentication data 172 and instruction set 173, NFC circuitry 170 includes an NFC integrated circuit chip 174 and a NFC compliant antenna 176. NFC IC chip 174 includes, among other things, an NFC transceiver 175, which not only senses and decodes induced electrical signals supplied by antenna 176, but also selectively excites antenna 176 with appropriate electrical signals as directed by instruction set 173 and/or processor module 150. (In some embodiments, NFC circuitry 170 is implemented as one or more integrated circuits.) In various embodiments, communications IC or NFC circuitry 170 is compatible with two or more NFC Types, such as two or more of the following: Forum Type 1, Type 2, Type 3 Type 4 or Type MIFARE Classic Tag standards and/or one or more of the International Standard Organization (ISO) standards: ISO/IEC14443 or with the Japanese Industrial Standard (JIS) X 6419-4. In one example embodiment, authentication data 172 is factory configured or written to match the authentication data stored on authentication device 102.

In some embodiments, electronic device 100 can be configured, for example at an initial start up or through a set up menu, to generate and store authentication data (within NFC interface module 163) in NFC memory 171 and to direct NFC circuitry 170 to write the generated authentication data to device 102. In some embodiments, device 102 may be preconfigured with authentication data and upon a first reading by NFC circuitry 170, NFC interface module 163 prompts the user with a question of whether she desires to pair the authentication device with the electronic device, or with one or more applications or portions of applications within applications module 162 or with one or more features or functions of operating system 161.

Wearable authentication device 102 includes a wearable structure 1021, an NFC tag integrated circuit (IC) 1022. Wearable structure 1021, in the example embodiment, takes the form of an annular or ring-like configuration sized for a human finger, wrist, or other human body part. NFC tag IC 1022, which in the example embodiment takes the form of a commercially available NFC tag IC, includes, among other things, a memory 1022A, which stores authentication code data 1022B. It also includes a transceiver circuit and an antenna, which enable it to communicate one or more portions of authentication data 1022B as a modulated 13.56 megahertz RF signal through its antenna to an adjacent NFC reader, such reader 175 in device 100. The data, which may be encrypted in some embodiments, includes a unique device identifier from the TAG IC of the wearable authentication device. The device data that corresponds to the wearable authentication device may also include any other type of user and/or device identifying features, information, and data, such as a ring or wrist size, that is unique to the user who wears or owns a device including the assembly.

In various embodiments, communications IC or NFC tag IC 1022 is compatible with one or more NFC Forum Type 1, Type 2, Type 3 Type 4 or Type MIFARE Classic Tag standards and/or one or more of the International Standard Organization (ISO) standards: ISO/IEC14443 or with the Japanese Industrial Standard (JIS) X 6419-4. As such, the memory, in the example embodiment, ranges in capacity from 48 bytes to 1 megabyte and the transceiver supports communication speeds from 106 kbits/s to 424 kbits/s. However, other embodiments support alternative forms of inductive coupling and tag memory storage and communications protocols. Some embodiments of NFC tag IC 1022 include a magnet or magnetic element 1022C, which can be used to indicate presence of the tag for initial awakening of electronic device 100 as described below. In some embodiments, the magnetic element may be included in another part of wearable authentication device 102.

Example Methods

Figure 2:
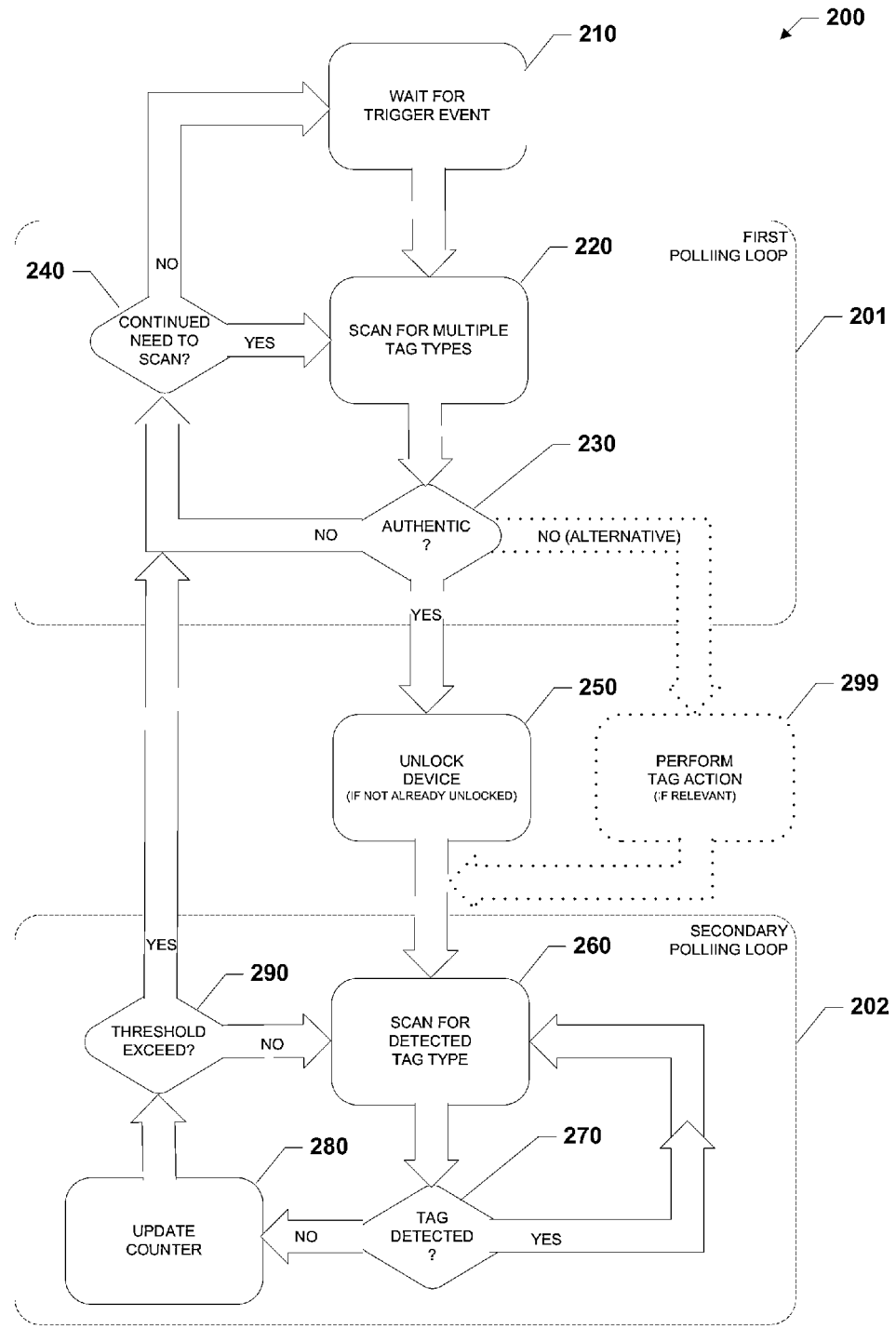
FIG. 2 is a flow chart of one or more methods corresponding to one or more embodiments.

FIG. 2 shows a flow chart 200 of one or more example methods of operating an apparatus or system, such as apparatus 100, or one or more components thereof, with particular emphasis on NFC related authentication functionality. Flow chart 200 includes process blocks 210-299, which are arranged and described in a serial execution sequence in the example embodiment. However, other embodiments could execute two or more blocks in parallel using multiple processors or processor-like circuits or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Additionally, the process flow can be readily recast in terms of a state diagram. Thus, the example process flow applies to software, hardware, and/or firmware implementations. In some embodiments, for example, the functions described in the blocks are performed by the application processor module and in others they are performed by processing circuitry within NFC IC 170; and in still others, the functions are performed in part by the application processor and in part by the circuitry on the NFC IC (NFC modem).

At block 210, the example method begins by waiting for a trigger event. In the example embodiment, the trigger event is activation of a mobile phone power switch or detection of a threshold level of magnetic flux from magnetic element 1022C, which individually or jointly cause activation of a display without providing access to the full functionality of the phone or other form of electronic device. Some embodiments, for example, may allow access to the camera or other applications, and prevent access to communications functions or sensitive data, such as contact data. Some embodiments allow for other trigger events, for example, a detected impact, motion of the associated device, connection to device port, or contact with a user to trigger the polling event. In the exemplary embodiment, the trigger event serves as a wake up for processor module 150, which will in turn control operation of the NFC modem circuitry according to the remaining process blocks. In other embodiments, the trigger event wakes up NFC modem circuitry 170 which operates independently of processor module 150 to perform the remaining process blocks. Example execution continues at block 220.

Block 220 entails scanning or polling for two or more NFC tag types. In the exemplary embodiment, this entails waking up processor module 150 from a sleep or deep-sleep state and causing it to communicate pursuant to instructions set 173 within NFC module 163 with NFC modem circuitry 170, which in turn polls sequentially for two or more NFC tag types of an authorized wearable authentication device, such as device 102 in FIG. 1. The exemplary embodiment polls for 6 different NFC tag types: NFC Active, Type A, Type B, Type F@424, Type F@212, and ISO015693 to allow for maximum interoperability with a variety of commercially available NFC authentication devices. The modulation and coding type along with the signaling sequence is handled by the NFC IC and reader 175 in accordance with ISO014443-2 and other corresponding standards. (The exemplary embodiment also supports card-emulation mode operation as part of the polling loop, enabling contactless payments. This portion of the polling loop may occupy the rest of the interval during which active tag detection does not occur. It is passive and consumes much less power, as the presence of a magnetic field from an external payment terminal is being detected, after which a payment transaction may be initiated.) When a tag is discovered and decoded, its embedded identification code and tag type is stored in memory (for example within the NFC modem circuitry 170 or within memory module 160), and execution advances to block 230.

Block 230 entails determining whether the found identification code is authentic or not. This entails comparing it to a stored authentication code within device 100, for example within NFC module 163 or within NFC modem circuitry 170. If the found code does not match the stored authentication code, execution branches to block 240 to poll for the next type of NFC tag and if it does match, execution advances to block 250.

Block 240 entails determining whether there is a need to continue scanning for authentication devices. In the example embodiment, this entails determining whether the phone is still activated for potential use, for example by determining whether the display is still turned on. (The display may have been turned off and locked automatically as a result of user inactivity, or failure of the device to recognize proper authentication.) If the phone is inactive, execution branches back to block 210 to wait for another trigger event. If the phone is still active, execution branches back to block 220 for continued scanning for proximate NFC tags. Blocks 220, 230, and 240 together comprise a primary polling loop or loop structure 201.

Block 250 entails unlocking one or more functions of device 100 (if those functions associated with found matching authentication code are currently locked.) In the exemplary embodiment, this entails providing total access to all functionality of device 100. However, in some embodiments, one or more functions—for example, contact management, texting or emailing—may require additional security to access, such as entry of a Personal Identification Number (PIN) or provision of a biometric identifier such as finger print, or iris scan. Example execution then proceeds to block 260. In some embodiments, unlocking also entails providing audible, visible, and/or tactile feedback to the user to indicate transition from locked to an unlocked state. Example visual feedback includes presenting a start-up screen on device 100 indicative of the unlocked state.

Block 260 entails scanning for presence of a single NFC tag type, rather than multiple tag types as performed at block 220. In the example embodiment, this entails scanning for an NFC tag that has the same type as that of the tag authenticated or more generally detected at block 230. In some embodiments that include a magnetometer or other magnetic sensing capability in the electronic device and a magnetic element associated with the authentication device (wearable or otherwise), scanning for the detected device may entail reading a sensed magnetic flux level. In some embodiments, the secondary polling loop supports card-emulation mode operation in addition to the reduced tag type detection while still maintaining reduced power consumption.

Block 270 entails determining whether any tag discovered at block 260 is of the same type as that discovered and authenticated at block 230. In some embodiments with the magnetic element associated with the authentication device and magnetic flux sensing capability in the electronic device, this determination entails determining whether the sensed magnetic flux exceeds a predetermined threshold level. If the tag is of the same type or the sensed flux exceeds the threshold, the device is assumed to be the same as that previously discovered and authenticated, and execution loops back to block 260. Some embodiments may include a delay element in the path back to block 260.

If the same type of tag is not discovered, execution branches to block 280, which entails updating, for example incrementing a counter of missing-tag events. (Some embodiments may use a count down counter and thus require decrementing the count.) The exemplary embodiment uses this counter in recognition that an authorized user may move relative to the electronic device while using it and thus temporarily reposition the wearable authentication device out of range of the NFC reader. Thus, to avoid undesirable locking of the device, a counter for missing-tag events is provided to permit a predetermined number of missing-tag events prior to locking the device.

Block 290 entails determining whether a condition based on the number of missing-tag events has been satisfied. In the exemplary embodiment, this entails determining whether a threshold number of missing-tag events, for example 5, has been exceeded. If the threshold number has been not been exceeded, execution branches back to block 260 under the assumption that the access to the device is still authorized. However, if the threshold number has been exceeded, execution branches back to block 240, where a determination of whether there is a continued need to scan for an authorized NFC tag is made. (Some embodiments include a device lockdown operation in the path from block 290 to 240, to prevent continued access to secured portions of the device when there is remaining time left before automatic screen/device lock or in some cases shutdown would occur.)

Notably, blocks 260, 270, 280, and 290 constitute a secondary polling loop or loop structure 202, which consumes less power than primary polling loop structure 201. Also, notable is inclusion of blocks 280 and 290, which create a tolerance of missing-tag events and thus allows the system to operate longer within the secondary polling loop and thus provide even greater power savings than embodiments that omit this feature.

Some embodiments also provide power savings for situations where an inauthentic NFC tag is persistently proximate the electronic device. This situation can occur, for example, in mobile phones that are placed in an NFC-tagged vehicle docking station and the phone is locked into an active display mode for safety. In this instance, block 240 would continually yield an affirmative decision because the display is locked on and result in repetitive operation of the first polling loop for the inauthentic tag. To address this circumstance, some embodiments branch from block 230 to block 299, instead of block 240. At block 299, the device, if the code in the tag is "understood" by the device, performs one or more associated actions. Example actions includes invoking a device dock mode, opening up a particular application, such as a navigation application; playing music; or initiating other device operations that do not require user authentication. No action is taken if the code is not understood. From block 299, execution advances to the secondary polling loop, where limited scanning is performed to reduce power consumption.

CONCLUSION

This document describes specific embodiments of one or more inventions. However, one of ordinary skill in the art appreciates that various modifications and changes can be made without departing from the scope of the invention(s) as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The scope of any invention described herein is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments can be implemented as a computer-readable storage medium having computer readable code stored thereon for programming a computer (e.g., including a processor) to perform a method as described and claimed herein. Likewise, computer-readable storage medium can include a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

What is claimed is:

1. A computer program product, comprising:
a non-transitory computer-readable storage device having computer-executable program instructions embodied thereon that when executed by a computer cause the computer to poll for near field communications (NFC) tags, the computer-executable program instructions comprising:
computer-executable program instructions to first poll, by a battery-powered electronic device, for two or more NFC tag types and to detect and authenticate a first NFC tag having a first NFC type; and
computer-executable program instructions to second poll, by the battery-powered electronic device and in response to detecting and affirmatively authenticating the first NFC tag having the first NFC type by the first poll, for an NFC tag that only has a type matching the first NFC type of the first NFC tag.

2. The computer program product of claim 1,
wherein operating the first poll comprises affirmatively authenticating the NFC tag of the first type, and
wherein the storage device further comprises computer-executable program instructions that when executed by the computer cause the computer to enable, by the battery-powered electronic device, user access to at least one portion of the battery-powered electronic device in response to the affirmative authentication.

3. The computer program product of claim 2, wherein the storage device further comprises computer-executable program instructions that when executed by a computer cause the computer to disable user access to the at least one portion of the battery-powered electronic device in response to a failure to detect an NFC tag of the first NFC type during the second poll.

4. The computer program product of claim 3, wherein disabling user access to the at least one portion of the battery-powered electronic device occurs in response to a predetermined number of multiple failures to detect an NFC tag of the first NFC type during the second poll.

5. The computer program product of claim 1,
wherein the first poll comprises determining that the NFC tag of the first NFC type is inauthentic, and
wherein the second poll occurs after determining that the NFC tag of the first NFC type is inauthentic and after causing the battery-powered electronic device to perform an enabling action based on data stored on the NFC tag of the first NFC type.

6. The computer program product of claim 5, wherein the battery-powered electronic device comprises a mobile telephone, and the enabling action comprises invoking a docking mode of operation.

7. The computer program product of claim 1, wherein the first poll polls for three or more NFC tag types, and the second poll polls for only one NFC tag type.

8. The computer program product of claim 1, wherein the battery-operated electronic device comprises a mobile telephone and the NFC tag of the first NFC type is part of a user wearable authentication device.

9. The computer program product of claim 8, wherein the user wearable authentication device comprises an annular structure sized to fit a human body part.

10. The computer program product of claim 1, wherein the second poll excludes determining whether an NFC tag of the first NFC type is authentic.

11. The computer program product of claim 1, wherein the second poll determines whether a condition contingent on a measured or sensed magnetic flux is satisfied.

12. A method, comprising:
first scanning, by a mobile telephone, for two or more near field communications (NFC) tag types;
authenticating, by the mobile telephone, a scanned first NFC tag having an NFC type; and
second scanning, by the mobile telephone and in response to an affirmative authentication, only for an NFC tag that has a type matching the NFC type of the first NFC tag.

13. The method of claim 12, further comprising unlocking at least one, but less than all, functions of the mobile telephone in response to the affirmative authentication.

14. The method of claim 13, further comprising locking at least one, but less than all, functions of the mobile telephone in response to a failure to detect an NFC tag that has a type matching the NFC type of the first NFC tag during the second polling.

15. The method of claim 14, wherein locking at least one, but less than all, functions of the mobile telephone occurs in response to a predetermined number of multiple failures to detect an NFC tag of the first type during the second scanning.

16. The method of claim 12,
wherein the authenticating comprises determining that the first NFC tag is inauthentic, and the method further comprises third scanning after determining that the NFC tag is inauthentic and after causing the mobile telephone to perform an enabling action based on data stored on the first NFC tag.

17. The method of claim 16, wherein the enabling action comprises invoking a docking mode of operation.

18. The method of claim 12, wherein the first scanning polls for three or more NFC tag types, and the second polling polls for only one NFC tag type.

19. The method of claim 11, wherein the NFC tag of the first NFC type is part of a user wearable authentication device.

20. The method of claim 12, wherein the second scanning excludes determining whether an NFC tag of the first NFC type is authentic.

21. A system to poll near field communication (NFC) tags, comprising:
    a storage device; and
    a processor communicatively coupled to the storage device, wherein the processor executes application code instructions that are stored in the storage device to cause the system to:
        first poll for two or more NFC tag types and affirmatively authenticate an NFC tag of a first type from the polled tags; and
        second poll, in response to the affirmative authentication of an NFC tag of the first type, for an NFC tag that only has a type matching the NFC type of the affirmatively authenticated tag.

22. The system of claim 21, wherein the processor further executes application code instructions that are stored in the storage device to cause the system to, responsive to the affirmative authentication unlocking at least one, but less than all, functions of the system.

23. The system of claim 21, wherein the processor further executes application code instructions that are stored in the storage device to cause the system, responsive to a predetermined number of multiple failures to detect an NFC tag of the first type during the second poll, to lock at least one, but less than all, functions of the system.

24. The system of claim 21, further comprising:
    a user wearable authentication device comprising the NFC tag of the first type; and
    a mobile telephone comprising the processor and the storage device.

25. The system of claim 24, wherein the user wearable authentication device comprises an annular structure sized to fit a human body part.

26. The system of claim 24, wherein the user wearable authentication device comprises an annular structure sized to fit a human body part.

27. The system of claim 21, wherein the second poll determines whether a condition contingent on a measured or sensed magnetic flux is satisfied.

28. The system of claim 21,
    wherein the first poll comprises determining that the first NFC tag is inauthentic, and
    wherein the second poll occurs after determining that the NFC tag is inauthentic and after causing a mobile telephone to perform an enabling action based on data stored on the first NFC tag.

29. The system of claim 28, wherein the enabling action comprises invoking a docking mode of operation.

30. The system of claim 21, wherein the processor executes application code instructions that cause the system to disable user access to the at least one portion of the system in response to a failure to detect an NFC tag of the first NFC type during the second poll.

31. The system of claim 21, wherein the first poll polls for three or more NFC tag types, and the second poll polls for only one NFC tag type.

32. The system of claim 21, wherein the system comprises a mobile telephone, and the NFC tag of the first NFC type is part of a user wearable authentication device.

* * * * *

UNITED STATES PATENT AND TRADEMARK OFFICE
CERTIFICATE OF CORRECTION

PATENT NO. : 9,858,450 B2  
APPLICATION NO. : 14/208936  
DATED : January 2, 2018  
INVENTOR(S) : James A. Van Bosch and Pavel A. Shostak Page 1 of 1

It is certified that error appears in the above-identified patent and that said Letters Patent is hereby corrected as shown below:

In the Claims

Column 11, Claim 19, Line 10 should read "--The method of claim 12, wherein the NFC tag of the--"

Signed and Sealed this
Third Day of July, 2018

Andrei Iancu
*Director of the United States Patent and Trademark Office*